Patented June 3, 1952

2,599,335

UNITED STATES PATENT OFFICE 2,599,335

MANUFACTURE OF GLYOXAL AND POLYGLYOXAL

René Léon Lehmann, Paris, and Josef Lintner, La Garenne Colombes, France, assignors to Bozel-Maletra Societe Industrielle de Produits Chimiques, Paris, France, a corporation of France No Drawing. Application November 2, 1948, Serial No. 58,029. In France April 24, 1948

3 Claims. (Cl. 260—601)

It is known that it is possible to prepare glyoxal by oxidizing acetaldehyde, particularly in the form of paraldehyde, by means of nitric acid. The mode of operation used in the art has been heretofore as follows:

Upon an aqueous solution of nitric acid there is superimposed a layer of paraldehyde and the temperature is maintained by cooling at about 10 to 15° C. In order to avoid an explosive reaction it is necessary in this method to carefully avoid a mixing of the two liquid layers. As an oxidizing catalyst it has been recommended to use carbon, silica gel and other similar catalysts in a finely divided form. In this known method the duration of the reaction is about 5 to 6 days.

In order to reduce such an exceptionally long and expensive duration of the reaction it has already been proposed to oxidize the aldehyde at a temperature between 30 and 60° C. starting preferably with paraldehyde and using as a catalyst nitrogen oxides which should be introduced in a continuous manner into the reaction mixture. The acetaldehyde which escapes with the residual gases is extracted by washing with water and then recovered by distillation. In this known method important amounts of nitrogen oxides should be used in order to avoid a "rushing" of the reaction and the explosions which would result therefrom. On the other hand, to avoid too great a loss of acetaldehyde the nitrogen oxides should be free of irrelavent gases. Now the manufacture and the handling of such large quantities of concentrated nitrogen oxides present great technical problems and are very expensive so that the said method has not been used commercially up to the present time.

It has now been found in applicant's laboratories that in order to effect the oxidation of acetaldehyde into glyoxal in a uniform manner and without any risk of a "rushing" of the reaction, the only condition is that the reaction mixture must always contain a sufficient amount of nitrous acid; the presence of nitrogen oxides is not necessary. This unexpected discovery has made it possible as will be seen hereunder, to materially simplify the procedure.

On the other hand applicants have found that while the main reaction should take place at a temperature higher than the decomposition temperature of the nitrous acid in order to obtain high reaction velocities, a part of the reaction may take place at a temperature lower than the said temperature without any reduction of the reaction velocity.

When the oxidation is effected at low temperatures by means of nitric acid a sufficient amount of nitrous acid is formed by the secondary reactions. When however in order to accelerate the reaction the operation is effected at higher temperatures, as is normally required in an industrial process, it is in principle necessary to add nitrous acid continuously. Now such a continuous addition of nitrous acid during the whole duration of the reaction would of course present a technical complication and a considerable expense.

In order to avoid this disadvantage, according to the invention, the oxidation of acetaldehyde is effected by the continuous introduction of nitric acid into the reaction chamber containing the acetaldehyde while continuously stirring and at a temperature higher than the decomposition temperature of the nitrous acid. A small amount of nitrous acid is introduced into the said chamber at the beginning of the reaction, and the residue gases containing acetaldehyde escaping from the said reaction chamber are then washer, preferably at a temperature lower than the decomposition temperature of nitrous acid. The washing liquid is preferably the nitric acid intended to effect the oxidation or a portion of the reaction solution which is then sent back into the said chamber.

In the practical embodiment of the method according to the invention, the operations take place preferably in the following manner:

The residual gases escaping from the reaction chamber are directed onto the lower portion of a column charged with a filling material, cooled with water and sprayed from above with the nitric acid which then flows towards the reaction chamber. By operating in this manner the acetaldehyde escaping from the reaction chamber is used for reducing nitric acid to nitrous acid. At the same time the consumed acetaldehyde is continuously replaced in the reaction chamber.

Contrary to recommendations in the known methods it is unnecessary when proceeding according to the present invention to use paraldehyde; it is sufficient and even preferable to use merely acetaldehyde.

The nitrous acid introduced in a small quantity at the beginning of the reaction may be conveniently in the form of a dilute solution of sodium nitrite which is added to the acetaldehyde-nitric mixture. As soon as the reaction has started any other addition of nitrous acid becomes unnecessary and the oxidation takes place rapidly without any risk of "rushing" or explosion. The duration of the reaction, which as stated above takes up to 5 or 6 days with the methods used up to the present time, may be reduced to about 5 to 7 hours by using the method according to the present invention.

The fact that this method makes it possible to use acetaldehyde, and that a portion of the said acetaldehyde is used to reduce the nitric acid into catalytic nitrous acid, is one of the factors producing the increase in reaction velocity and the much greater efficiency in glyoxal with respect to the acetaldehyde and nitric acid, as compared with the known methods heretofore used in the art.

The method is perfectly well adapted to continuous operation. In this case it is necessary to add nitrous acid, for example in the form of sodium nitrite, only when the equipment is just started. As soon as the reaction has started the said addition may be interrupted.

It has moreover been discovered that by proceeding according to the invention, and by using as an oxidizing agent an aqueous solution of nitrous acid having a density lower than 1.4, there is obtained at the end of the operations and after evaporation of the glyoxal, a white polyglyoxal having a purity of 95 to 100% which had never been realized up to the present time.

The method which is the object of the invention further offers the advantage that it requires no special installation for the recovery of the acetaldehyde carried away with the residual gases, since the said acetaldehyde is recycled with the washing liquid of the said gases.

It is alternatively possible to operate in the presence of other oxidizing catalysts added to nitrous acid, such as selenious anhydride, vanadic acid, manganese salts, or any other similar catalyst.

An example of the method according to the invention is given hereunder as an illustration.

*Example 1*

280 litres of water and 56 kilograms of acetaldehyde were mixed together in a closed container having a stirrer and provided with a good cooling system, after which 1100 kilograms of an aqueous solution of nitric acid at about 40% was poured into the said mixture. The temperature within the oxidation container was maintained at about 35–45° C. The acetaldehyde used was replaced in proportion to its consumption, thus further introducing on the whole, 125 kilograms acetaldehyde into the reaction mixture. The residual gases escaping from the reaction chamber were introduced at the base of a column charged with a filling material cooled with water, acting at the same time as a reflux cooling medium, the said column being sprayed from above with nitric acid which was directed back towards the reaction chamber. To start the reaction a small amount of an aqueous solution of sodium nitrite was added at the beginning of the operation. At the end of the oxidation about 1000 litres of an aqueous solution of glyoxal at 10 to 11% were obtained.

The said glyoxal solution when evaporated in vacuum gave a white powdered polyglyoxal similar in appearance to paraformaldehyde and having a purity degree higher than 95% which had never been realized before.

It is very easy to make the method continuous by continuously removing from the oxidation container a corresponding amount of the glyoxal solution so as to keep constant the liquid level in the reaction tank. In this case the above mentioned addition of sodium nitrite solution is only necessary when the apparatus is first started.

What we claim is:

1. A method for the manufacture of glyoxal and polyglyoxal through oxidation of an aldehyde of the group consisting of acetaldehyde and paraldehyde, comprising the steps of reacting said aldehyde while stirring, with nitrous acid in slight excess and nitric acid in excess, in a closed space, at a temperature above that of decomposition of nitrous acid, continuously recovering the evolved gases containing unreacted aldehyde, nitrogen monoxide and sesquioxide, washing said gases in a countercurrent of fresh nitric acid and cold water at a temperature lower than that of decomposition of nitrous acid, whereby a solution of nitrous and nitric acids containing the said unreacted aldehyde is obtained, continuously introducing said solution into said closed space for reaction with a new quantity of free aldehyde continuously substituted for the consumed aldehyde, the sesquioxide being eliminated from the reaction cycle, and removing the formed glyoxal from the closed spaced.

2. A method for the manufacture of glyoxal and polyglyoxal through oxidation of an aldehyde of the group consisting of acetaldehyde and paraldehyde, comprising the steps of reacting said aldehyde while stirring, with nitrous acid in slight excess and nitric acid in excess, in a closed space, at a temperature in the range of 35 to 45° C., continuously recovering the evolved gases containing unreacted aldehyde, nitrogen monoxide and sesquioxide, washing said gases in a countercurrent of fresh nitric acid and cold water at a temperature in the range of 15 to 20° C., whereby a solution of nitrous and nitric acids containing the said unreacted aldehyde is obtained, continuously introducing said solution into said closed space for reaction with a new quantity of free aldehyde continuously substituted for the consumed aldehyde, the sesquioxide being eliminated from the reaction cycle, and removing the formed glyoxal from the closed space.

3. A method for the manufacture of glyoxal and polyglyoxal through oxidation of an aldehyde of the group consisting of acetaldehyde and paraldehyde, comprising the steps of reacting said aldehyde while stirring, with nitrous acid in slight excess and nitric acid in excess, in a closed space, at a temperature in the range of 35 to 40° C., continuously recovering the evolved gases containing unreacted aldehyde, nitrogen monoxide and sesquioxide, washing said gases in a countercurrent of a portion of the reaction mixture containing free nitric acid and cold water at a temperature in the range of 15 to 20° C., whereby a solution of nitrous and nitric acids containing the said unreacted aldehyde is obtained, continuously introducing said solution into said closed space for reaction with a new quantity of free aldehyde continuously substituted for the consumed aldehyde, the sesquioxide being eliminated from the reaction cycle and removing the formed glyoxal from the closed space.

RENÉ LÉON LEHMANN.
JOSEF LINTNER.

REFERENCES CITED

The following references are of record in the file of this patent:

UNITED STATES PATENTS

| Number | Name | Date |
|---|---|---|
| 2,312,468 | Ebel et al. | Mar. 2, 1943 |
| 2,389,950 | Bremner et al. | Nov. 27, 1945 |
| 2,459,690 | Doumani et al. | Jan. 18, 1949 |
| 2,467,442 | Overhoff et al. | Apr. 19, 1949 |

FOREIGN PATENTS

| Number | Country | Date |
|---|---|---|
| 573,721 | Germany | Apr. 5, 1933 |